Oct. 7, 1924.  
T. PARKER ET AL  
1,510,699  
SAFETY HEADLIGHT  
Filed Feb. 27, 1923
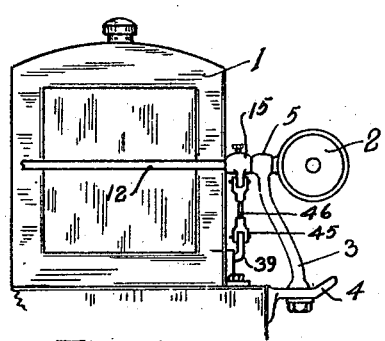
Fig. 1.
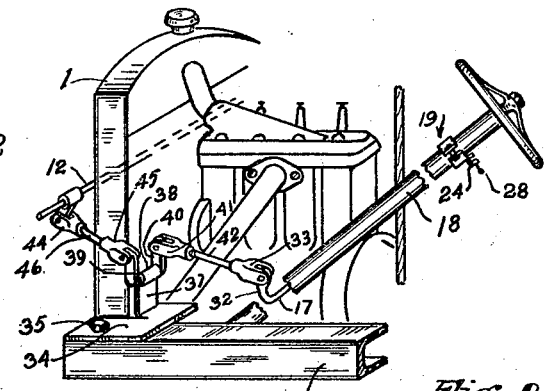
Fig. 2.
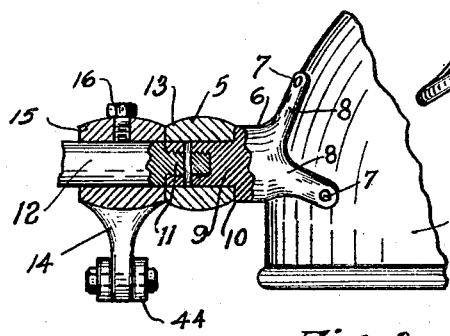
Fig. 3.
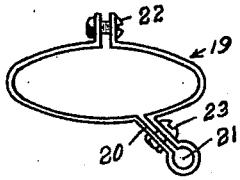
Fig. 5.
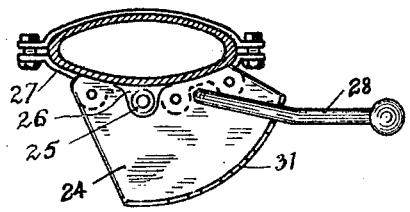
Fig. 6
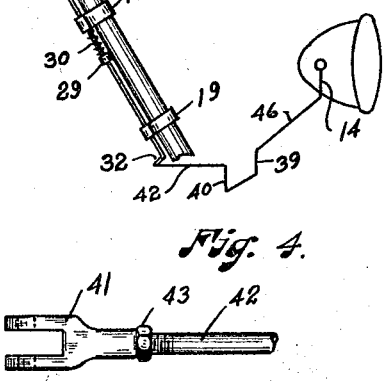
Fig. 4.
Fig. 8.
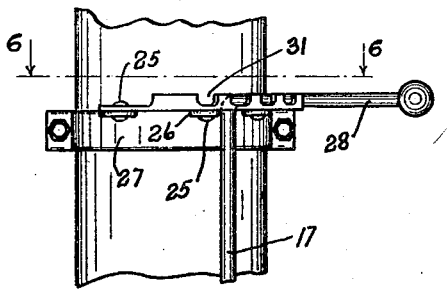
Fig. 7.
Inventor  
Thadd. Parker  
James C. Lawrence.  
Fred G. Dunn.  
By A. J. O'Brien  
Attorney Patented Oct. 7, 1924.

1,510,699

UNITED STATES PATENT OFFICE.

THADDEUS PARKER, JAMES C. LAWRENCE, AND FRED G. DUNN, OF PRIMERO, COLORADO.

SAFETY HEADLIGHT.

Application filed February 27, 1923. Serial No. 621,532.

*To all whom it may concern:*

Be it known that we, THADDEUS PARKER, JAMES C. LAWRENCE, and FRED G. DUNN, citizens of the United States, residing at Primero, county of Las Animas, and State of Colorado, have invented certain new and useful Improvements in Safety Headlights; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile headlights of the type described in our co-pending application, Serial No. 603,322, filed November 25, 1922.

It is well known that a large number of accidents occur annually due to the fact that the drivers become temporarily blinded by the glare of the approaching headlights and is thus unable to see the road.

It is the object of this invention to produce a headlight that can be tilted about a horizontal axis so that the driver, by moving a lever, may change the angle of his lamps whenever he meets an automobile.

We are aware that lamps have been patented which rotate about a horizontal axis and therefore do not consider ourselves to be the inventors of this idea in its broadest sense, but rather of a new and improved manner of mounting the lamps and of an improved mechanism for operating them.

In order to more clearly describe our present invention, reference will be had to the accompanying drawing, in which:

Fig. 1 is a front view of a part of an automobile showing the manner of supporting the lamps.

Fig. 2 is a perspective view showing the operating mechanism.

Fig. 3 is a detail view partly in section and shows one way in which the lamps may be secured to the end of the shaft.

Fig. 4 is a side elevation of a portion of the steering post showing our attachment secured thereto and indicating diagrammatically the manner in which connection is made with the lamp.

Fig. 5 is a detail of one of the clamping means employed.

Fig. 6 is a section taken on line 6—6, Fig. 7.

Fig. 7 is a side elevation of the parts shown in Fig. 6.

Fig. 8 is a view on an enlarged scale showing one of the clevises employed.

The same reference characters will be employed to designate the same parts throughout the several figures.

Numeral 1 designates the radiator of an automobile and 2 one of the headlight lamps. The ordinary supporting means for the headlights has been dispensed with and in lieu thereof a support 3 has been substituted. This support is bolted at its lower end to the fender brace 4 in the usual manner. The upper end of support 3 has an enlarged portion 5 which has a transverse opening therethrough and serves as a bearing for rotatable parts which will be hereinafter described. Secured to one side of each lamp is a lug 6 which is secured to the lamp housing by means of rivets or bolts 7 that pass through the fingers 8. Lug 6 has the end 9 thereof reduced in diameter to such an extent that it will rotatably fit the hole in the bearing 5. The shoulder 10 formed between the parts 6 and 9 of different diameters, abuts the end of bearing 5 in the manner shown in Fig. 3. The part 9 has a threaded axial opening adapted to receive the threaded reduced portion 11 of shaft 12. After the parts 9 and 11 have been screwed together, a diametrical hole is bored and a pin 13 is inserted. It is of course self-evident that the pin 13 cannot be inserted or removed with the parts in the position shown in Fig. 3 and it may be explained here that when the parts are assembled the bearing 5 is moved over on the shaft 12, at least one of the supports 3 being removed from the brace 4 for this purpose. A crank 14 has an enlarged part 15 which fits over the end of shaft 12 and is clamped thereto by means of a set screw 16.

When the parts are assembled, as above described, it is evident that the lamp 2 may be rotated in the bearing 5 and that it will have no longitudinal motion with respect thereto. When the parts are properly adjusted there will be no rattle. The lamp on the other side, which has not been shown, is secured to the shaft 12 and to the automobile fender brace in the same manner as above explained, with the exception that instead of a crank 14, a collar, corresponding to part 15, is substituted. The lamps which are mounted for rotation about the horizontal axis, as above described, must also be provided with means whereby they may be tilted at will by the driver without the necessity of removing more than one hand from the steering wheel, and this for an instant only. For the purpose of operating the lamps, we secure a rod 17 to the side of the steering post 18 by means of clips 19 of substantially the shape shown in Fig. 5. The clips are preferably made of a single piece of flexible material which has an offset part 20 terminating in a circular loop 21, through which the rod 17 passes. The ends of the clip are curved so as to fit about the steering post and are clamped together by means of a bolt 22. A similar bolt 23 passes through the sides of the offset part 20. Near the top of the steering post is a special quadrant 24 which can be stamped out of a single piece of material if desired, but which is shown as being attached by means of rivets 25 with ears 26 formed integral with the strap 27. The outer curved edge of the plate 24 is notched and the teeth are bent upwardly, as shown in Fig. 7. The rod 17 passes through an opening in the plate 24 and is then bent at right angles, the end forming a lever 28. Below one of the clips 19 a ring 29 is secured to the rod and forms an abutment for the lower end of spring 30 whose upper end abuts the clip 19, the purpose of the spring 30 being to produce a force tending to move the rod 17 downwardly, whereby the handle portion 28 will be held in place in the notches 31. The lower end 32 of rod 17 is bent outwardly at right angles to form a crank to the end of which the clevis 33 is pivotally attached. A plate 34 has one end provided with an opening for the reception of a bolt 35, by means of which it is secured to the top of channel 36. The part 37, which is integral with the plate 34, is bent upwardly at right angles and its upper end 38 is bent about the central portion of the U-shaped piece which has substantially parallel sides 39 and 40. A clevis 41 is secured to the end of the side 40 and is connected by a rod 42 with the clevis 33. The ends of rod 42 are threaded and adjustments may be made by turning the clevises. When proper adjustments have been made, the parts are locked by means of lock nuts 43. Clevises 44 and 45, similar to clevises 33 and 41, are connected to the end of crank 14 and side 39 and are connected by a threaded rod 46. It will now be apparent that by rotating the rod 17 the lamps 2 will be rotated about the axis of shaft 12 and will be held in adjusted position by means of the handle 28 and notches 31.

When driving along a country road or any place where traffic in the opposite direction is not continuous, as it usually is in the cities, the lamps can be kept in the elevated position and when meeting another machine, the lamps can be tilted downward until the other machine has passed. It will be apparent that when the lamps are tilted downwardly, the road immediately in front of the automobile will be well illuminated. By disconnecting the clevis 44 from the crank 14, the lamps may be rotated 180 degrees, thus throwing the light to the rear which is a great convenience in case repairs, such as the changing of tires, must be done after dark.

We desire to call special attention to the mechanism for tilting the lamps, as we believe this to be especially well adapted for the purpose. By our mechanism the angle of the lamps can be changed almost instantly by merely moving the lever 28 to the desired notch 31, where it will remain until returned.

Having now described the invention, what is claimed as new is:

A tiltable lamp for automobiles comprising, in combination, a frame; a horizontal shaft rotatably supported by said frame; a lamp secured to each end of said shaft; a support secured to said frame; a U-shaped member pivotally secured to said support; a crank arm secured to said shaft; a link connecting the end of the crank to one side of the U-shaped member, whereby, when the latter is rocked on its pivot, it will oscillate the shaft; a steering post secured to the frame; a rod rotatably connected to the steering post, said rod having its lower end bent at right angles to form a crank; means connecting the last named crank to one side of the U-shaped member, whereby the rotation of the rod will rock the U-shaped member and tilt the lamps; a quadrant secured to the steering post near its upper end, said rod passing through said quadrant, the upper end of the rod being bent at right angles to form a handle; and notches in the edge of the quadrant for holding the rod in adjusted position.

In testimony whereof we affix our signatures.

THADD. PARKER.
JAMES C. LAWRENCE.
FRED G. DUNN.